April 4, 1950  G. S. PETERSON  2,503,064
MELON PLUGGER AND APPLE CORER
Filed Dec. 10, 1946
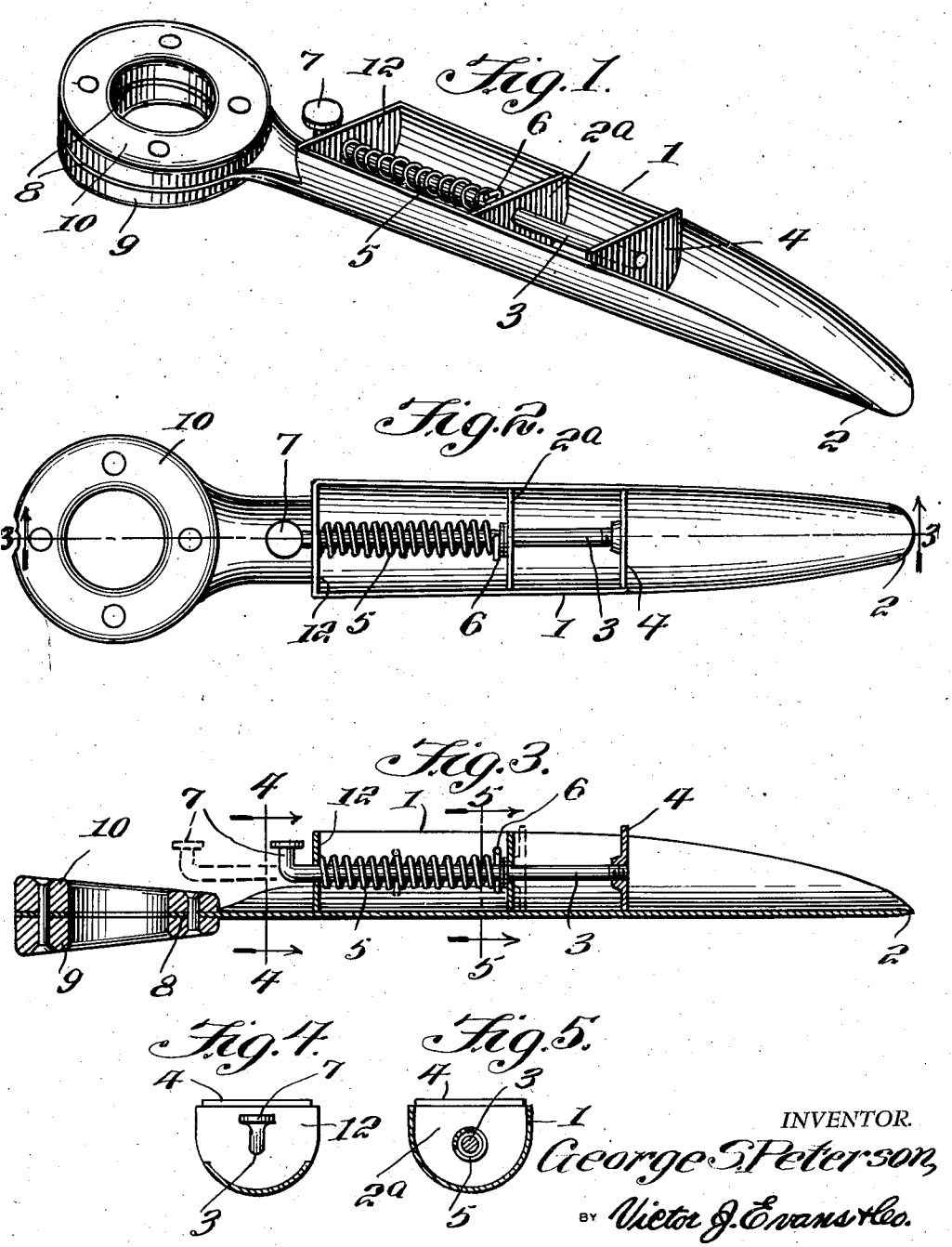
INVENTOR.
George S. Peterson,
BY Victor J. Evans & Co.
ATTORNEYS Patented Apr. 4, 1950

2,503,064

UNITED STATES PATENT OFFICE 2,503,064

MELON PLUGGER AND APPLE CORER

George S. Peterson, Sturgeon Bay, Wis.

Application December 10, 1946, Serial No. 715,216

2 Claims. (Cl. 30—128)

This invention relates to improvements in apple corers and melon pluggers, and more particularly to the provision of a device in which an apple core or melon plug is automatically pushed out after it has been cut.

An object is to provide an apple corer and melon plugger which can be easily and quickly manipulated without the usual cleaning operations incident to ordinary corers.

A further object is to provide an apple corer and melon plugger of simple structure, effective in operation with few parts to get out of order, and which can be manufactured at a low cost.

These and other objects are attained by the novel construction and arrangement of parts hereinafter described and illustrated by the accompanying drawings, forming a part hereof, and in which:

Fig. 1 is a perspective of an apple and melon plugging device embodying the invention.

Fig. 2 is a plan view of the device.

Fig. 3 is a sectional view taken on the line 3—3 of Fig. 2.

Fig. 4 is a sectional view taken on the line 4—4 of Fig. 3.

Fig. 5 is a sectional view taken on the line 5—5 of Fig. 3.

Referring to the drawings, the apple corer and melon plugger is shown to comprise a main semi-cylindrical elongated or trough-like body 1, with a cutting lip 2, and an intermediate fixed wall 2a through which passes a rod 3 having fixed to one end thereof a movable wall 4. The rod 3 is mounted for longitudinal movement along the body 1 and encircled by a coiled spring 5 which abuts a pin 6 on the rod 3 and the end wall 12.

The rod 3 is provided with manually-operable means embodying a handle 7 by means of which the movable wall 4 can be drawn towards wall 2a against the action of the coil spring 5.

In coring an apple or plugging a melon, the movable wall 4 is drawn back towards wall 2a and the cutting lip 2 inserted in the apple or melon. After the proper plug has been made, the handle 7 is released, and the spring through movable wall 4 forces the core or plug out of the body 1.

To facilitate the manipulation of the device, the body 1 has a flat extension 8, which has a central opening surrounded by two rings 9 and 10, to provide a handle, the opening accommodating a finger so that a good grip can be obtained.

It will be seen that there has been provided a simple and effective apple corer and melon plugger by means of which coring and plugging operations can be rapidly and properly performed, the device automatically cleaning the device when the handle 7 is released.

The above description is to be considered as illustrative and not limitative of the invention of which modifications can be made without departing from the spirit and scope of the appended claims.

The invention having been described, what is claimed is:

1. In a device for coring fruit, an elongated trough-shaped body provided with a cutting lip adjacent one end thereof for insertion in said fruit, an end wall arranged on the other end of said body and secured to the latter, a fixed wall arranged in spaced, parallel relation with respect to said end wall and secured to said body, a rod mounted for longitudinal movement along said body and supported by said end and fixed walls, a movable wall mounted for movement toward and away from said fixed wall and operatively connected to one end of said rod, manually operable means secured to the other end of said rod for causing longitudinal movement of the latter, and resilient means on said rod for biasing said movable wall away from said fixed wall.

2. In a device for coring fruit, an elongated trough-shaped body provided with a cutting lip adjacent one end thereof for insertion in said fruit, an end wall arranged on the other end of said body and secured to the latter, a fixed wall arranged in spaced, parallel relation with respect to said end wall and secured to said body, a rod mounted for longitudinal movement along said body and supported by said end and fixed walls, a movable wall mounted for movement toward and away from said fixed wall and operatively connected to one end of said rod, manually operable means secured to the other end of said rod for causing longitudinal movement of the latter, resilient means embodying a coil spring circumposed on said rod for biasing said movable wall away from said fixed wall, and a handle secured to said body, there being an opening in said handle for the reception therein of a user's finger.

GEORGE S. PETERSON.

REFERENCES CITED

The following references are of record in the file of this patent:

UNITED STATES PATENTS

| Number | Name | Date |
| --- | --- | --- |
| 1,448,652 | Anderson et al. | Mar. 13, 1923 |
| 2,113,085 | Higgs | Apr. 5, 1938 |